(12) United States Patent
Yi et al.

(10) Patent No.: US 9,327,750 B2
(45) Date of Patent: May 3, 2016

(54) STROLLER FRAME AND STROLLER THEREWITH

(71) Applicants: Ze-Hua Yi, Guangdong (CN); Fangming Li, Guangdong (CN)

(72) Inventors: Ze-Hua Yi, Guangdong (CN); Fangming Li, Guangdong (CN)

(73) Assignee: Wonderland Nurserygoods Company Limited, Kwai Chung, N.T. (HK)

( * ) Notice: Subject to any disclaimer, the term of this patent is extended or adjusted under 35 U.S.C. 154(b) by 71 days.

(21) Appl. No.: 13/961,900

(22) Filed: Aug. 8, 2013

(65) Prior Publication Data

US 2014/0042730 A1 Feb. 13, 2014

(30) Foreign Application Priority Data

Aug. 9, 2012 (CN) ...................... 2012 2 0394251 U (51) Int. Cl.
*B62B 1/00* (2006.01)
*B62B 3/02* (2006.01)
*B62B 7/00* (2006.01)

(52) U.S. Cl.
CPC ................ *B62B 3/022* (2013.01); *B62B 7/006* (2013.01)

(58) Field of Classification Search
CPC ........ B62B 7/142; B62B 7/145; B62B 7/004; B62B 7/14
USPC ................ 280/658, 642, 650, 647, 649, 47.4, 280/47.38
See application file for complete search history.

(56) References Cited

U.S. PATENT DOCUMENTS

| | | | | |
|---|---|---|---|---|
| 2,880,011 A * | 3/1959 | Peterson | ........................ | 280/649 |
| 3,550,998 A * | 12/1970 | Korol | ....................... | A47D 1/06 280/31 |
| 5,558,357 A * | 9/1996 | Wang | ............................ | 280/647 |
| 5,709,400 A * | 1/1998 | Bonnier et al. | ............... | 280/650 |
| 6,416,077 B1 * | 7/2002 | Chen | ........................ | B62B 7/08 280/47.38 |
| 7,118,116 B2 * | 10/2006 | Lin | ............ | B62B 7/04 280/47.38 |
| 7,188,858 B2 * | 3/2007 | Hartenstine | ............ | B62B 7/083 280/642 |
| 7,410,185 B2 * | 8/2008 | Chen | ....................... | B62B 9/102 280/642 |
| D580,829 S * | 11/2008 | Jacobs | ......................... | D12/129 |
| 7,686,323 B2 * | 3/2010 | Chen | ............................ | 280/642 |
| 7,938,435 B2 * | 5/2011 | Sousa et al. | .................... | 280/658 |
| D648,659 S * | 11/2011 | Brevi | ........................... | D12/129 |
| 8,585,075 B2 * | 11/2013 | Zhong | ........................... | 280/648 |
| 8,651,502 B2 * | 2/2014 | Winterhalter et al. | ....... | 280/47.4 |
| 8,696,016 B2 * | 4/2014 | Homan | ................... | B62B 7/105 280/47.34 |
| 2003/0193172 A1 * | 10/2003 | Lin | ........................... | B62B 7/10 280/642 |
| 2007/0069504 A1 * | 3/2007 | Lan | ................................ | 280/642 |
| 2008/0284136 A1 | 11/2008 | Tsai | | |
| 2011/0062681 A1 | 3/2011 | Tsai | | |
| 2011/0215553 A1 | 9/2011 | Thorne et al. | | |
| 2013/0277949 A1 * | 10/2013 | Yin et al. | ...................... | 280/658 |

FOREIGN PATENT DOCUMENTS

DE 299 10 609 U1 10/1999
DE 201 12 122 U1 1/2002

(Continued)

*Primary Examiner* — Hau Phan (74) *Attorney, Agent, or Firm* — Winston Hsu; Scott Margo (57) ABSTRACT

The present invention provides a stroller frame adapted for a stroller and the stroller with the stroller frame. The stroller frame includes a handle, a front foot pivoted to the handle, a bottom pipe pivoted to the front foot, and a linking mechanism pivoted with the handle, the front foot and the bottom pipe. Thus, the present invention provides the stroller frame and the stroller therewith capable of being folded easily and with simple structure.

17 Claims, 9 Drawing Sheets

(56) References Cited

FOREIGN PATENT DOCUMENTS

| | | | |
|---|---|---|---|
| DE | 10 2012 011 526 A1 | 12/2012 |
| EP | 1 755 333 A2 | 2/2007 |
| EP | 2 404 807 A2 | 1/2012 |
| GB | 2464087 A | 4/2010 |
| GB | 2477180 A | 7/2011 |

\* cited by examiner

STROLLER FRAME AND STROLLER THEREWITH

BACKGROUND OF THE INVENTION

1. Field of the Invention

The present invention relates to a stroller frame and a stroller therewith, and more specifically, to a stroller frame and a stroller therewith capable of being folded easily and with simple structure.

2. Description of the Prior Art

For parents, a stroller is a convenient and common device for carrying and taking care of a baby, without holding the baby in the arms. However, the conventional stroller incapable of being folded occupies space, especially within a small room, which results in inconvenience to the user. Hence, there is a need to design a foldable stroller to solve above problems.

SUMMARY OF THE INVENTION

A purpose of the present invention is to provide a stroller frame and a stroller therewith capable of being folded easily and with simple structure, to solve the problems mentioned above.

In order to achieve above purposes, the present invention is to provide a stroller frame including a handle, a front foot pivoted to the handle, a bottom pipe pivoted to the front foot, and a linking mechanism pivoted with the handle, the front foot and the bottom pipe.

Preferably, a pivotal direction of the handle relative to the front foot is identical to a pivotal direction of the bottom pipe relative to the front foot.

Preferably, the linking mechanism comprises a linking piece pivoted to the handle, and a linking pipe assembly pivoted with the linking piece, the front foot and the bottom pipe.

Preferably, the linking pipe assembly comprises an upper linking pipe pivoted to the linking piece and the front foot, and a lower linking pipe pivoted to the upper linking pipe and the bottom pipe.

Preferably, a pivotal direction of the linking piece relative to the upper linking pipe is identical to a pivotal direction of the lower linking pipe relative to the upper linking pipe.

Preferably, a pivotal direction of the linking piece relative to the handle is identical to a pivotal direction of the front foot relative to the handle.

Preferably, a pivotal direction of the handle relative to the front foot, a pivotal direction of the upper linking pipe relative to the front foot, and a pivotal direction of the bottom pipe relative to the front foot are identical.

Preferably, a pivotal direction of the lower linking pipe relative to the bottom pipe is identical to a pivotal direction of the front foot relative to the bottom pipe.

Preferably, a pivotal joint of the handle and the front foot, a pivotal joint of the handle and the linking piece, a pivotal joint of the linking piece and the upper linking pipe, a pivotal joint of the upper linking pipe and the lower linking pipe, a pivotal joint of the lower linking pipe and the bottom pipe, a pivotal joint of the front foot and the upper linking pipe, and a pivotal joint of the front foot and the bottom pipe are not overlapped.

Preferably, the stroller frame further includes an engaging device disposed between the handle and the front foot for restraining or releasing a pivotal movement of the handle relative to the front foot.

Preferably, the engaging device comprises an upper connecting component connected to the handle, a lower connecting component connected to the front foot and pivoted to the upper connecting component, and an engaging component movably disposed on the upper connecting component for engaging with or separating from the lower connecting component.

Preferably, an engaging slot is formed on the upper connecting component, the lower connecting component comprises an engaging portion disposed inside the engaging slot and pivoted to an inner wall of the engaging slot, and the engaging component is movably disposed inside the engaging slot for engaging with or separating from the engaging portion.

Preferably, the engaging device further comprises a first resilient component disposed between the upper connecting component and the engaging component for resiliently pushing the engaging component to engage with the lower connecting component.

Preferably, the stroller frame further includes a locking device disposed on the handle and connected to the engaging device for driving the engaging device to lock or release the pivotal movement of the handle relative to the front foot.

Preferably, the locking device comprises a base connected to the handle, a handle portion movably connected to the engaging device and disposed in the base, and a locking button disposed between the base and the handle portion for locking or releasing a movement of the handle portion relative to the base.

Preferably, the locking device further comprises a second resilient component disposed between the locking button and the base for resiliently pushing the locking button to engage with the handle portion.

Preferably, the locking button comprises a stopping rib, and the handle portion comprises a stopping protrusion to engage with the stopping rib.

In order to achieve above purposes, the present invention is further to provide a stroller including a stroller frame including a handle, a front foot pivoted to the handle, a bottom pipe pivoted to the front foot, and a linking mechanism pivoted with the handle, the front foot and the bottom pipe. The stroller further includes a seat detachably connected to the linking mechanism.

In order to achieve above purposes, the present invention is further to provide a stroller including a stroller frame including a handle, a front foot pivoted to the handle, a bottom pipe pivoted to the front foot, and a linking mechanism pivoted with the handle, the front foot and the bottom pipe. The stroller further includes a wheel assembly pivoted to the front foot and the bottom pipe.

In the present invention, the stroller frame is capable of being folded by the linking mechanism pivoted with the handle, the front foot and the bottom pipe, to achieve a purpose of folding the stroller conveniently and easily. Hence, the present invention provides the stroller frame and the stroller therewith capable of being folded easily and with simple structure.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention maybe practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
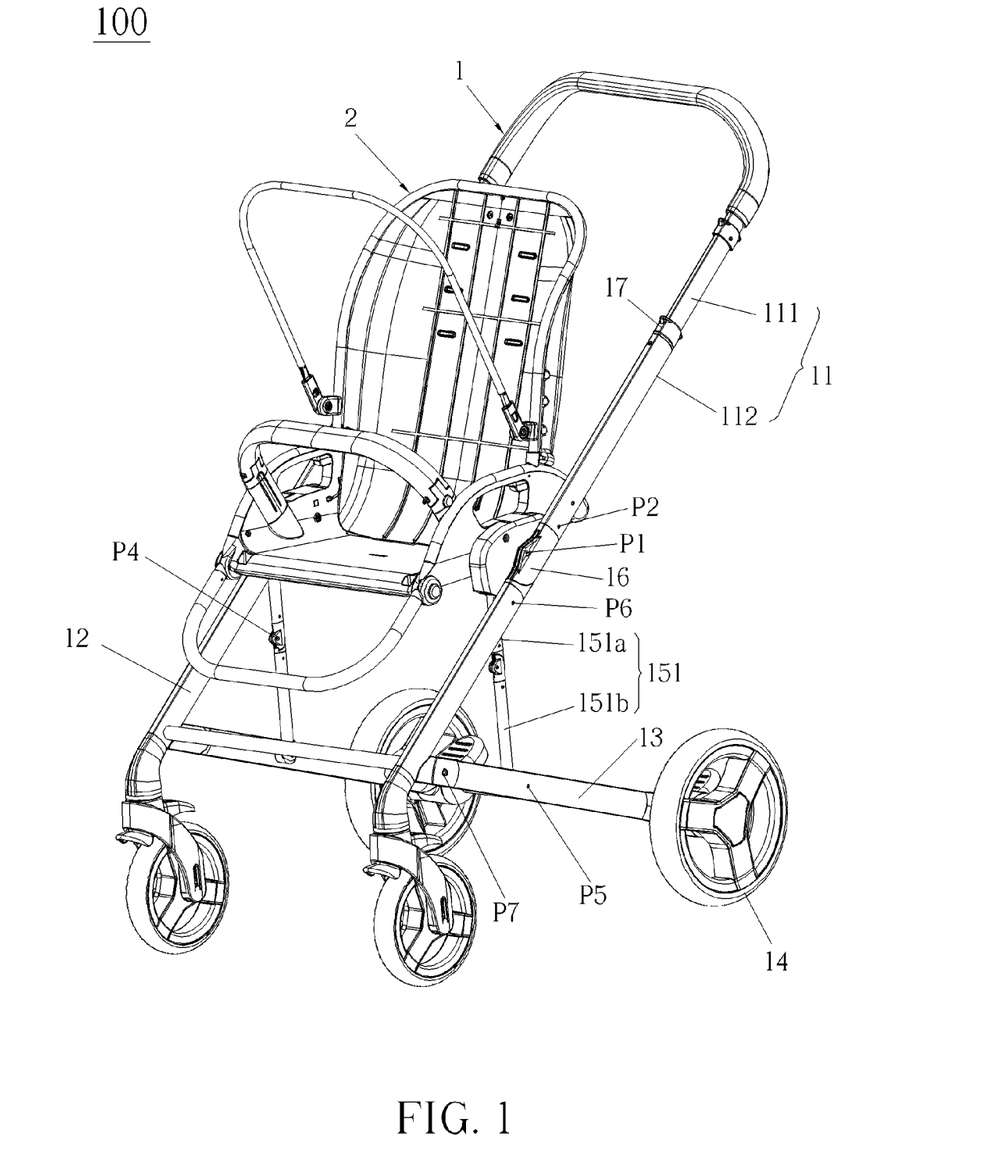
FIG. 1 is a schematic drawing of a stroller according to an embodiment of the present invention.

Please refer to FIG. 1. FIG. 1 is a schematic drawing of a stroller 100 according to an embodiment of the present invention. The stroller 100 includes a stroller frame 1. The stroller frame 1 includes a handle 11, a front foot 12 pivoted to the handle 11, a bottom pipe 13 pivoted to the front foot 12, and a linking mechanism 15 pivoted with the handle 11, the front foot 12 and the bottom pipe 13. The stroller 100 further includes a seat 2 detachably connected to the link mechanism 15, and a wheel assembly 14 pivoted to the front foot 12 and the bottom pipe 13. The stroller frame 1 further includes an engaging device 16 and a locking device 17. The engaging device 16 is disposed between the handle 11 and the front foot 12 for restraining or releasing a pivotal movement of the handle 11 relative to the front foot 12. The locking device 17 is disposed on the handle 11 and connected to the engaging device 16 for driving the engaging device 16 to lock or release the pivotal movement of the handle 11 relative to the front foot 12.

Specifically, a lower end of the handle 11 is pivoted to an upper end of the front foot 12. A lower end of the front foot 12 is pivoted to a front end of the bottom pipe 13. Preferably, a pivotal direction of the handle 11 relative to the front foot 12 is identical to a pivotal direction of the bottom pipe 13 relative to the front foot 12. The wheel assembly 14 is connected to the lower end of the front foot 12 and a rear end of the bottom pipe 13. The handle 11 includes an upper handle portion 111 and a lower handle portion 112.

Figure 2:
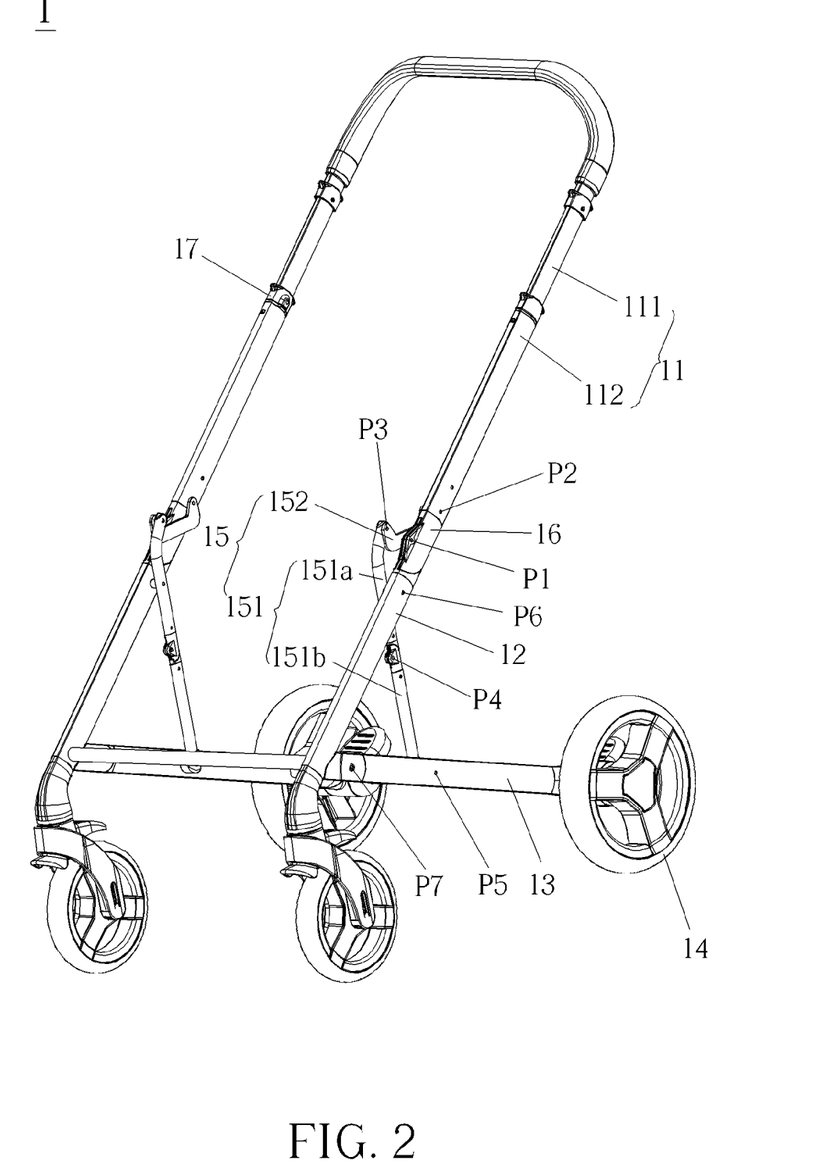
FIG. 2 is a schematic drawing of the stroller without disposing a seat according to the embodiment of the present invention.
Figure 3:
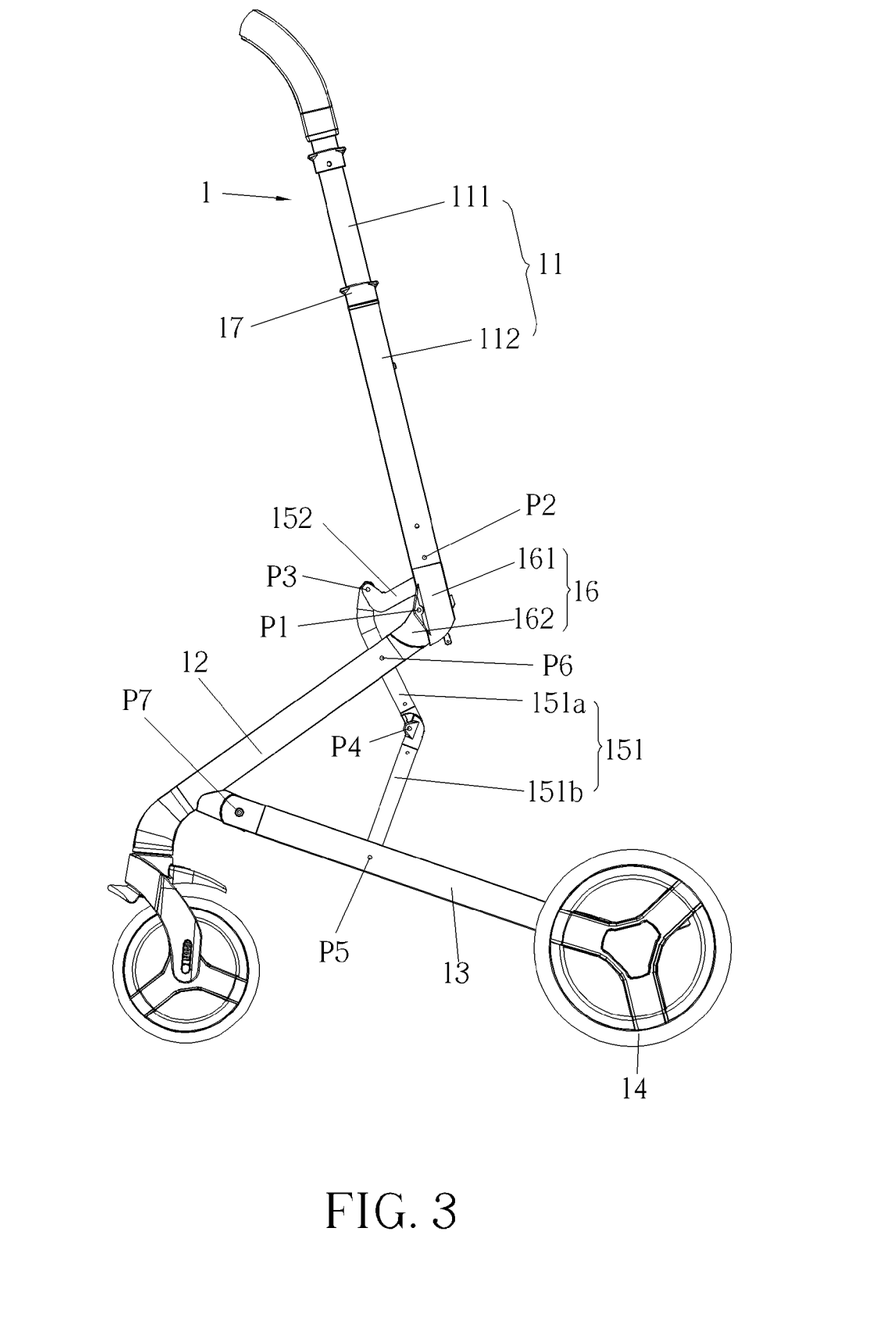
FIG. 3 is a lateral view of the stroller being folded according to the embodiment of the present invention.
Figure 4:
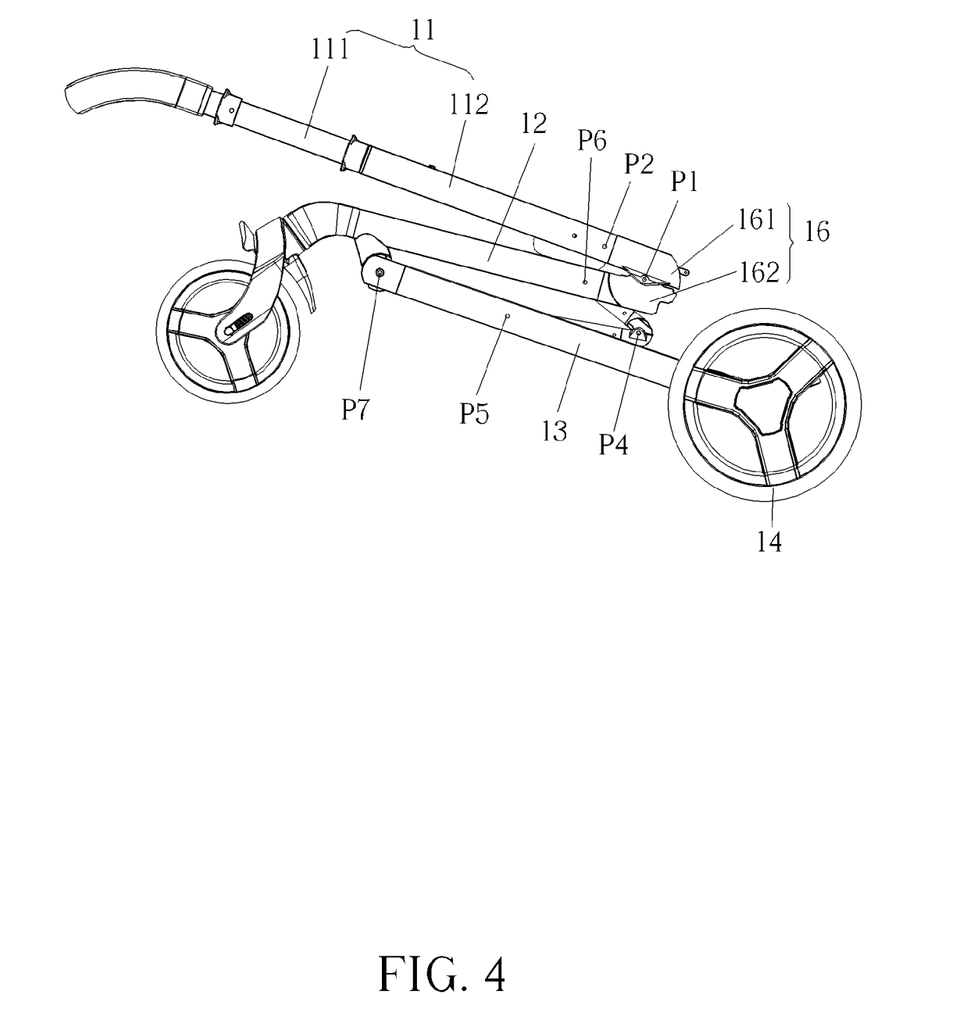
FIG. 4 is a lateral view of the stroller having been folded according to the embodiment of the present invention.

Please refer to FIG. 1 to FIG. 4. FIG. 2 is a schematic drawing of the stroller 100 without disposing the seat 2 according to the embodiment of the present invention. FIG. 3 is a lateral view of the stroller 100 being folded according to the embodiment of the present invention. FIG. 4 is a lateral view of the stroller 100 having been folded according to the embodiment of the present invention. The linking mechanism 15 is disposed on an inner side of the lower handle portion 112, and an upper end of the linking mechanism 15 is pivoted to the lower handle portion 112. A lower end of the linking mechanism 15 is pivoted to the bottom pipe 13. Specifically, the linking mechanism 15 includes a linking piece 152 pivoted to the handle 11, and a linking pipe assembly 151 pivoted with the linking piece 152, the front foot 12 and the bottom pipe 13. Two ends of the linking piece 152 are respectively pivoted to the handle 11 and an upper end of the linking pipe assembly 151. The linking pipe assembly 151 is pivoted to the front foot 12 and the bottom pipe 13 in sequence. The linking pipe assembly 151 includes an upper linking pipe 151a pivoted to the linking piece 152 and the front foot 12, and a lower linking pipe 151b pivoted to the upper linking pipe 151a and the bottom pipe 13. Preferably, an upper end of the upper linking pipe 151a is pivoted to the linking piece 152, and a lower end of the upper linking pipe 151a is pivoted to an upper end of the lower linking pipe 151b. A lower end of the lower linking pipe 151b is pivoted to the bottom pipe 13. A middle part of the upper linking pipe 151a is pivoted to the front foot 12.

Preferably, a pivotal direction of the linking piece 152 relative to the upper linking pipe 151a is identical to a pivotal direction of the lower linking pipe 151b relative to the upper linking pipe 151a. A pivotal direction of the linking piece 152 relative to the handle 11 is identical to a pivotal direction of the front foot 12 relative to the handle 11. A pivotal direction of the handle 11 relative to the front foot 12, a pivotal direction of the upper linking pipe 151a relative to the front foot 12, and a pivotal direction of the bottom pipe 13 relative to the front foot 12 are identical. A pivotal direction of the lower linking pipe 151b relative to the bottom pipe 13 is identical to a pivotal direction of the front foot 12 relative to the bottom pipe 13. Furthermore, a pivotal joint P1 of the handle 11 and the front foot 12, a pivotal joint P2 of the handle 11 and the linking piece 152, a pivotal joint P3 of the linking piece 152 and the upper linking pipe 151a, a pivotal joint P4 of the upper linking pipe 151a and the lower linking pipe 151b, a pivotal joint P5 of the lower linking pipe 151b and the bottom pipe 13, a pivotal joint P6 of the front foot 12 and the upper linking pipe 151a, and a pivotal joint P7 of the front foot 12 and the bottom pipe 13 are not overlapped.

Figure 5:
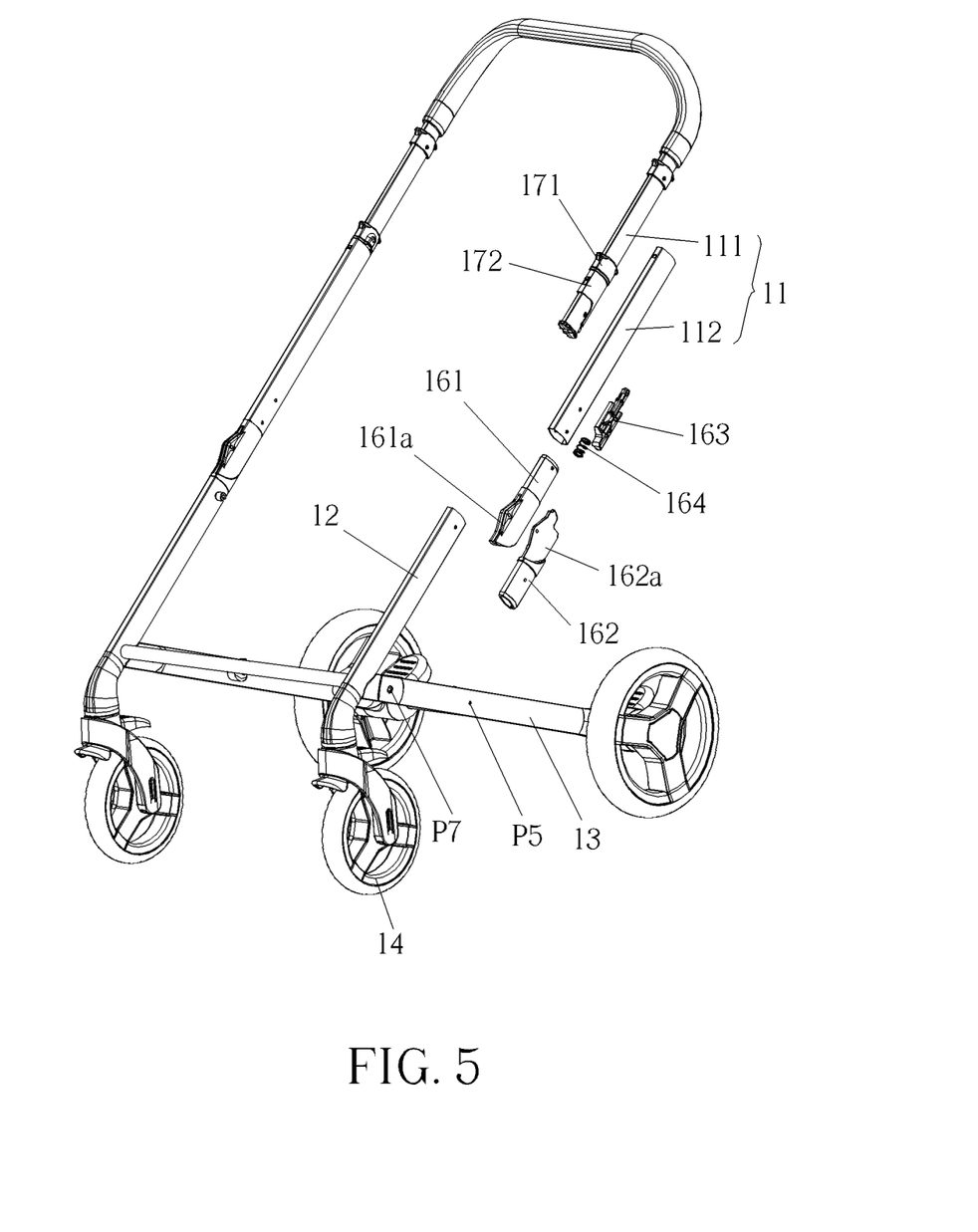
FIG. 5 is an exploded diagram of the stroller according to the embodiment of the present invention.
Figure 6:
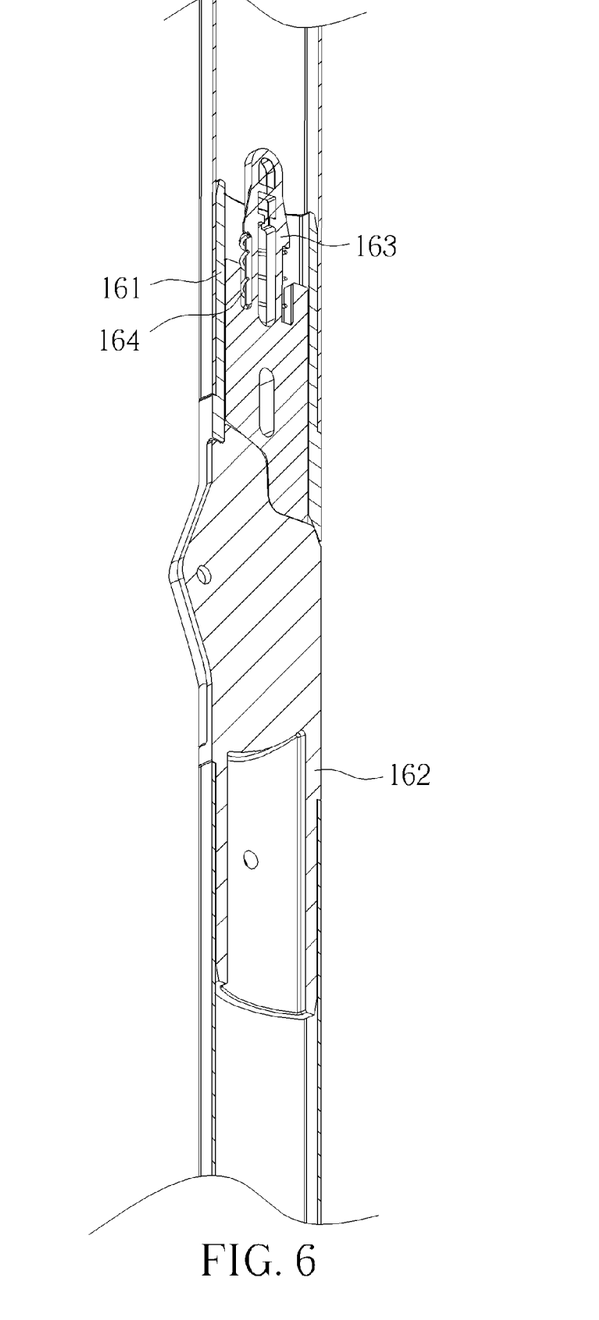
FIG. 6 is a sectional diagram of an engaging device according to the embodiment of the present invention.
Figure 7:
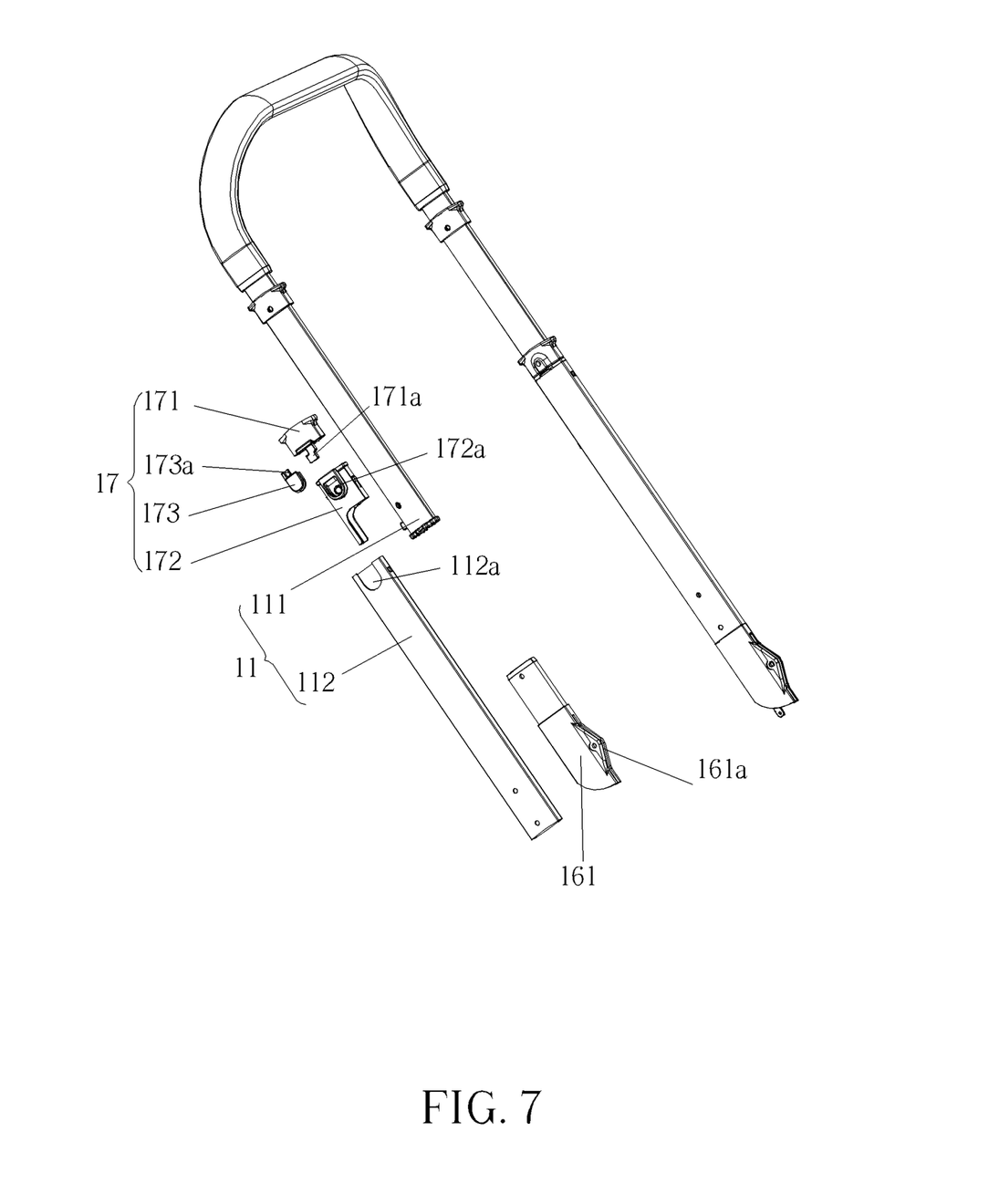
FIG. 7 is an exploded diagram of the engaging device and a locking device according to the embodiment of the present invention.
Figure 8:
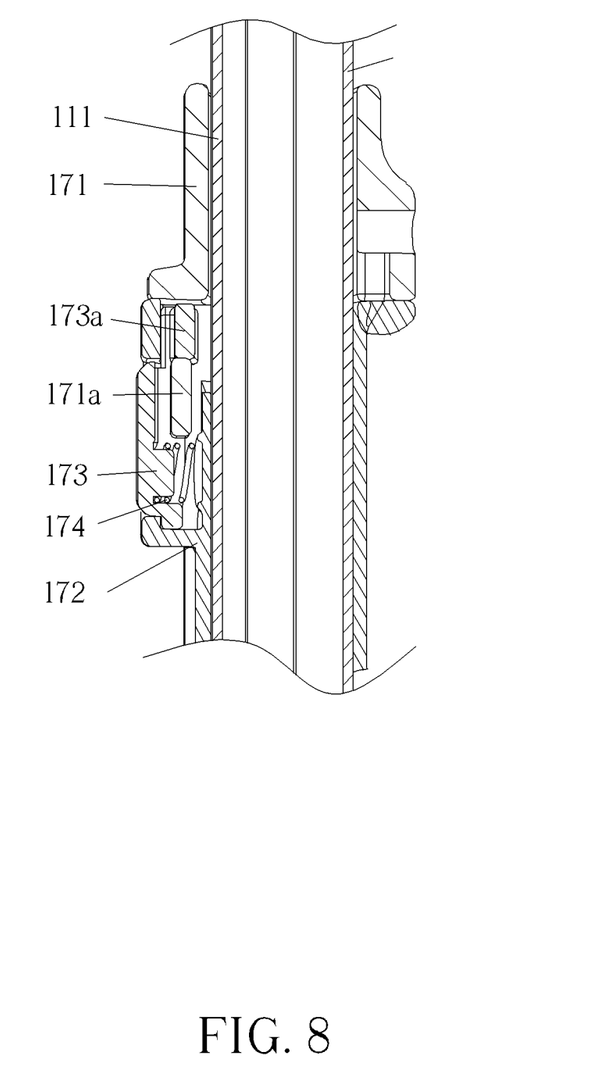
FIG. 8 is a sectional diagram of the locking device in a locking state according to the embodiment of the present invention.
Figure 9:
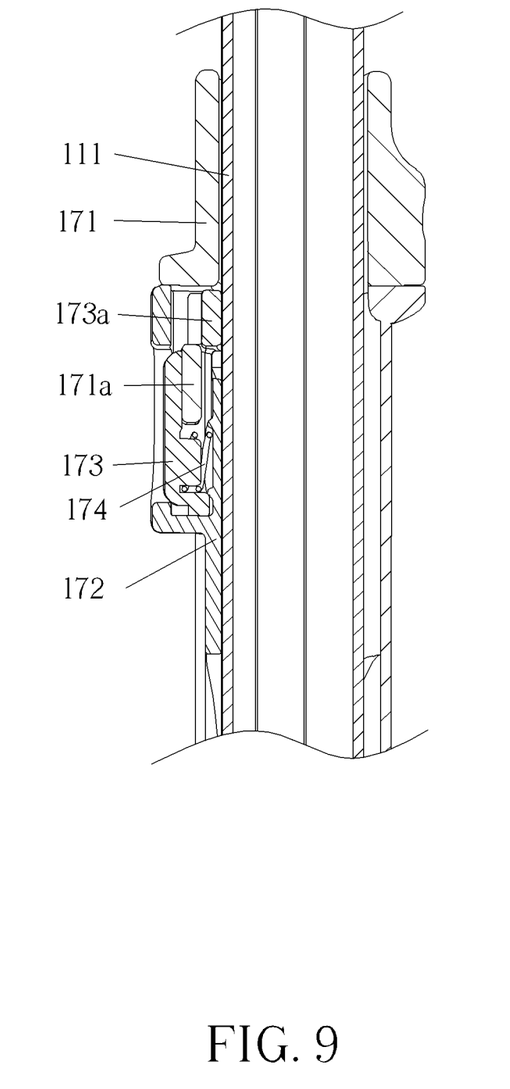
FIG. 9 is a sectional diagram of the locking device in a releasing state according to the embodiment of the present invention.

Please refer to FIG. 1 to FIG. 9. FIG. 5 is an exploded diagram of the stroller 100 according to the embodiment of the present invention. FIG. 6 is a sectional diagram of the engaging device 16 according to the embodiment of the present invention. FIG. 7 is an exploded diagram of the engaging device 16 and the locking device 17 according to the embodiment of the present invention. FIG. 8 is a sectional diagram of the locking device 17 in a locking state according to the embodiment of the present invention. FIG. 9 is a sectional diagram of the locking device 17 in a releasing state according to the embodiment of the present invention. The engaging device 16 includes an upper connecting component 161 connected to the handle 11, a lower connecting component 162 connected to the front foot 12 and pivoted to the upper connecting component 161, and an engaging component 163 movably disposed on the upper connecting component 161 for engaging with or separating from the lower connecting component 162, so as to lock or release a pivotal movement of the upper connecting component 161 relative to the lower connecting component 162. Specifically, the upper connecting component 161 is fixed in the handle 11. The lower connecting component 162 is fixed in the front foot 12. The upper connecting component 161 and the lower connecting component 162 are pivoted to each other. Preferably, an engaging slot 161a is formed on the upper connecting component 161, the lower connecting component 162 includes an engaging portion 162a disposed inside the engaging slot 161a and pivoted to an inner wall of the engaging slot 161a, and the engaging component 163 is movably disposed inside the engaging slot 161a for engaging with or separating from the engaging portion 162a. The engaging device 16 further includes a first resilient component 164 disposed between the upper connecting component 161 and the engaging component 163 for resiliently pushing the engaging component 163 to engage with the lower connecting component 162. The first resilient component 164 can be a spring. The first resilient component 164 sheathes the engaging component 163 and resiliently contacts against the engaging component 163.

The locking device 17 is disposed on the handle 11 and connected to the engaging device 16 via a wire for driving the engaging device 16 to lock or release the pivotal movement of the handle 11 relative to the front foot 12. The locking device 17 includes a base 172 connected to the handle 11, a handle portion 171 movably connected to the engaging device 16 and disposed in the base 172, and a locking button 173 disposed between the base 172 and the handle portion 171 for locking or releasing a movement of the handle portion 171 relative to the base 172. Specifically, the handle portion 171 slidably sheathes the upper handle portion 111 and is connected to the wire. The base 172 is fixed in the lower handle portion 112. The locking button 173 is slidably connected to the base 172 and is selectively engaged with the handle portion 171. The locking button 173 includes a stopping rib 173a, and the handle portion 171 includes a stopping protrusion 171a to engage with the stopping rib 173a. That is, the stopping protrusion 171a is protruded into the locking button 173 to engage with stopping rib 173a. The locking device 17 further includes a second resilient component 174 disposed between the locking button 173 and the base 172 for resiliently pushing the locking button 173 to engage with the handle portion 171. The second resilient component 174 can be a spring. The second resilient component 174 resiliently contacts against the locking button 173 and the base 172. The base 172 includes an installing portion 172a, which can be a slot structure. The locking button 173 and the second resilient component 174 are installed in the installing portion 172a. The lower handle portion 112 includes a slot structure 112a, and the installing portion 172a is disposed inside the slot structure 112a to expose outside the lower handle portion 112.

The folding procedure of the stroller 100 is introduced as follows. As for folding the stroller 100, the locking button 173 is pressed inwardly to separate the stopping rib 173 from the stopping protrusion 171 and to compress the second resilient component 174. Then, the handle portion 171 is pulled upwardly to pull the wire to drive the engaging component 163 so that the engaging portion 162a of the lower connecting component 162 separates from the engaging component 163. As the engaging portion 162a is separate from the engaging component 163 to release the pivotal movement of the upper connecting component 161 relative to the lower connecting component 162, it can stop pressing the locking button 173 so that the second resilient component 174 resiliently recovers the locking button 173 to an initial position. Then, the handle 11 is pushed forwardly to pivot the handle 11 relative to the front foot 12 around the pivotal joint P1, which is a pivotal joint of the engaging portion 162a and the inner wall of the engaging slot 161a. At the same time, the handle 11 pivots relative to the linking piece 152 around the pivotal joint P1. The handle 11 continues to be pushed downwardly, so that the linking piece 152 pivots relative to the upper linking pipe 151a around the pivotal joint P3. It can drive the upper linking pipe 151a so that the upper linking pipe 151a pivots close to the lower linking pipe 151b around the pivotal joint P4, and the lower linking pipe 151b pivots close to the bottom pipe 13 around the pivotal joint P5. At the same time, the middle part of the upper linking pipe 151a pivots close to the front foot 12 around the pivotal joint P6, and the front foot 12 pivots close to the bottom pipe 13 around the pivotal joint P7. It accomplishes folding the stroller frame 1 with simple structure.

In contrast with the prior art, the stroller frame is capable of being folded by the linking mechanism pivoted with the handle, the front foot and the bottom pipe, to achieve a purpose of folding the stroller conveniently and easily. Hence, the present invention provides the stroller frame and the stroller therewith capable of being folded easily and with simple structure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stroller frame adapted for a stroller, the stroller frame comprising:
   a handle;
   a front foot pivoted to the handle;
   a bottom pipe pivoted to the front foot; and
   a linking mechanism directly pivoted with the handle, and pivoted with the front foot and the bottom pipe, the linking mechanism comprising:
      a linking piece pivoted to the handle; and
      a linking pipe assembly pivoted with the linking piece, the front foot and the bottom pipe, the linking pipe assembly comprising:
         an upper linking pipe pivoted to the linking piece and the front foot, the upper linking pipe comprising an upper end and a lower end respectively located at opposite ends of the upper linking pipe; and
         a lower linking pipe pivoted to the upper linking pipe and the bottom pipe, wherein the upper linking pipe is pivoted with linking piece with the upper end and pivoted with the lower linking pipe with the lower end, and the upper linking pipe pivoted with the front foot intermediately at a location between the upper end and the lower end.

2. The stroller frame of claim 1, wherein a pivotal direction of the handle relative to the front foot is identical to a pivotal direction of the bottom pipe relative to the front foot.

3. The stroller frame of claim 1, wherein a pivotal direction of the linking piece relative to the upper linking pipe is identical to a pivotal direction of the lower linking pipe relative to the upper linking pipe.

4. The stroller frame of claim 1, wherein a pivotal direction of the linking piece relative to the handle is identical to a pivotal direction of the front foot relative to the handle.

5. The stroller frame of claim 1, wherein a pivotal direction of the handle relative to the front foot, a pivotal direction of the upper linking pipe relative to the front foot, and a pivotal direction of the bottom pipe relative to the front foot are identical.

6. The stroller frame of claim 1, wherein a pivotal direction of the lower linking pipe relative to the bottom pipe is identical to a pivotal direction of the front foot relative to the bottom pipe.

7. The stroller frame of claim 1, wherein a pivotal joint of the handle and the front foot, a pivotal joint of the handle and the linking piece, a pivotal joint of the linking piece and the upper linking pipe, a pivotal joint of the upper linking pipe and the lower linking pipe, a pivotal joint of the lower linking pipe and the bottom pipe, a pivotal joint of the front foot and the upper linking pipe, and a pivotal joint of the front foot and the bottom pipe are not overlapped.

8. The stroller frame of claim 1, further comprising an engaging device disposed between the handle and the front foot for restraining or releasing a pivotal movement of the handle relative to the front foot.

9. The stroller frame of claim 8, wherein the engaging device comprises an upper connecting component connected to the handle, a lower connecting component connected to the front foot and pivoted to the upper connecting component, and an engaging component movably disposed on the upper connecting component for engaging with or separating from the lower connecting component.

10. The stroller frame of claim 9, wherein an engaging slot is formed on the upper connecting component, the lower connecting component comprises an engaging portion disposed inside the engaging slot and pivoted to an inner wall of the engaging slot, and the engaging component is movably disposed inside the engaging slot for engaging with or separating from the engaging portion.

11. The stroller frame of claim 9, wherein the engaging device further comprises a first resilient component disposed between the upper connecting component and the engaging component for resiliently pushing the engaging component to engage with the lower connecting component.

12. The stroller frame of claim 8, further comprising a locking device disposed on the handle and connected to the engaging device for driving the engaging device to lock or release the pivotal movement of the handle relative to the front foot.

13. The stroller frame of claim 12, wherein the locking device comprises a base connected to the handle, a handle portion movably connected to the engaging device and disposed in the base, and a locking button disposed between the base and the handle portion for locking or releasing a movement of the handle portion relative to the base.

14. The stroller frame of claim 13, wherein the locking device further comprises a second resilient component disposed between the locking button and the base for resiliently pushing the locking button to engage with the handle portion.

15. The stroller frame of claim 13, wherein the locking button comprises a stopping rib, and the handle portion comprises a stopping protrusion to engage with the stopping rib.

16. A stroller comprising:
   a stroller frame comprising:
      a handle;
      a front foot pivoted to the handle;
      a bottom pipe pivoted to the front foot; and
      a linking mechanism directly pivoted with the handle, and pivoted with the front foot and the bottom pipe, the linking mechanism comprising:
         a linking piece pivoted to the handle; and
         a linking pipe assembly pivoted with the linking piece, the front foot and the bottom pipe, the linking pipe assembly comprising:
            an upper linking pipe pivoted to the linking piece and the front foot, the upper linking pipe comprising an upper end and a lower end respectively located at opposite ends of the upper linking pipe; and
            a lower linking pipe pivoted to the upper linking pipe and the bottom pipe, wherein the upper linking pipe is pivoted with linking piece with the upper end and pivoted with the lower linking pipe with the lower end, and the upper linking pipe pivoted with the front foot intermediately at a location between the upper end and the lower end; and
   a seat detachably connected to the linking mechanism.

17. A stroller comprising:
   a stroller frame comprising:
      a handle;
      a front foot pivoted to the handle;
      a bottom pipe pivoted to the front foot; and
      a linking mechanism directly pivoted with the handle, and pivoted with the front foot and the bottom pipe, the linking mechanism comprising:
         a linking piece pivoted to the handle; and
         a linking pipe assembly pivoted with the linking piece, the front foot and the bottom pipe, the linking pipe assembly comprising:
            an upper linking pipe pivoted to the linking piece and the front foot, the upper linking pipe comprising an upper end and a lower end respectively located at opposite ends of the upper linking pipe; and
            a lower linking pipe pivoted to the upper linking pipe and the bottom pipe, wherein the upper linking pipe is pivoted with linking piece with the upper end and pivoted with the lower linking pipe with the lower end, and the upper linking pipe pivoted with the front foot intermediately at a location between the upper end and the lower end; and
   a wheel assembly pivoted to the front foot and the bottom pipe.

* * * * *